Nov. 26, 1963 C. C. FIGGE 3,111,733
ROPE END SPLICER AND CONNECTOR
Filed April 18, 1960 3 Sheets-Sheet 2

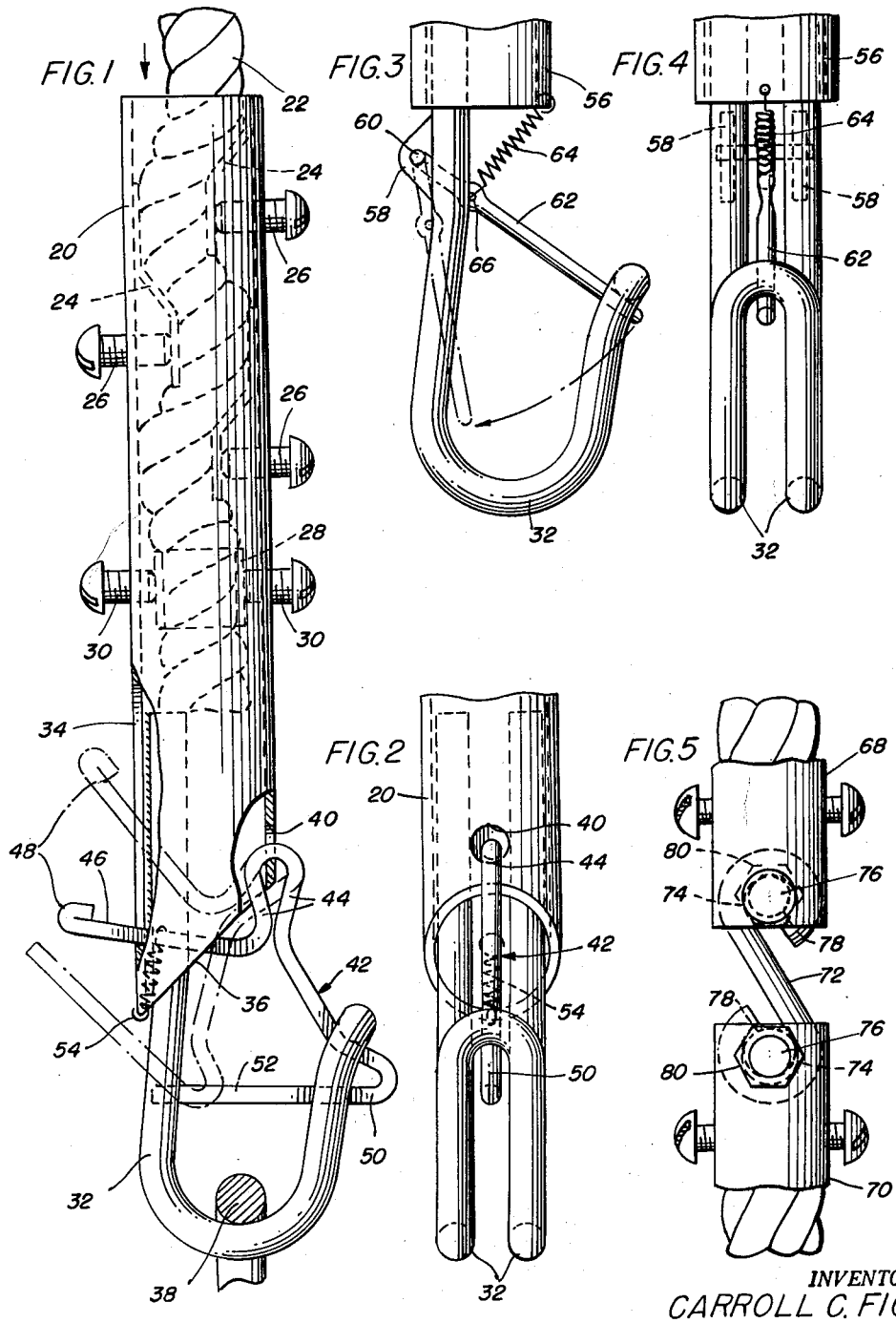

INVENTOR:
CARROLL C. FIGGE
BY Kent W. Wonnell
ATT'Y

Nov. 26, 1963     C. C. FIGGE     3,111,733
ROPE END SPLICER AND CONNECTOR
Filed April 18, 1960     3 Sheets-Sheet 3
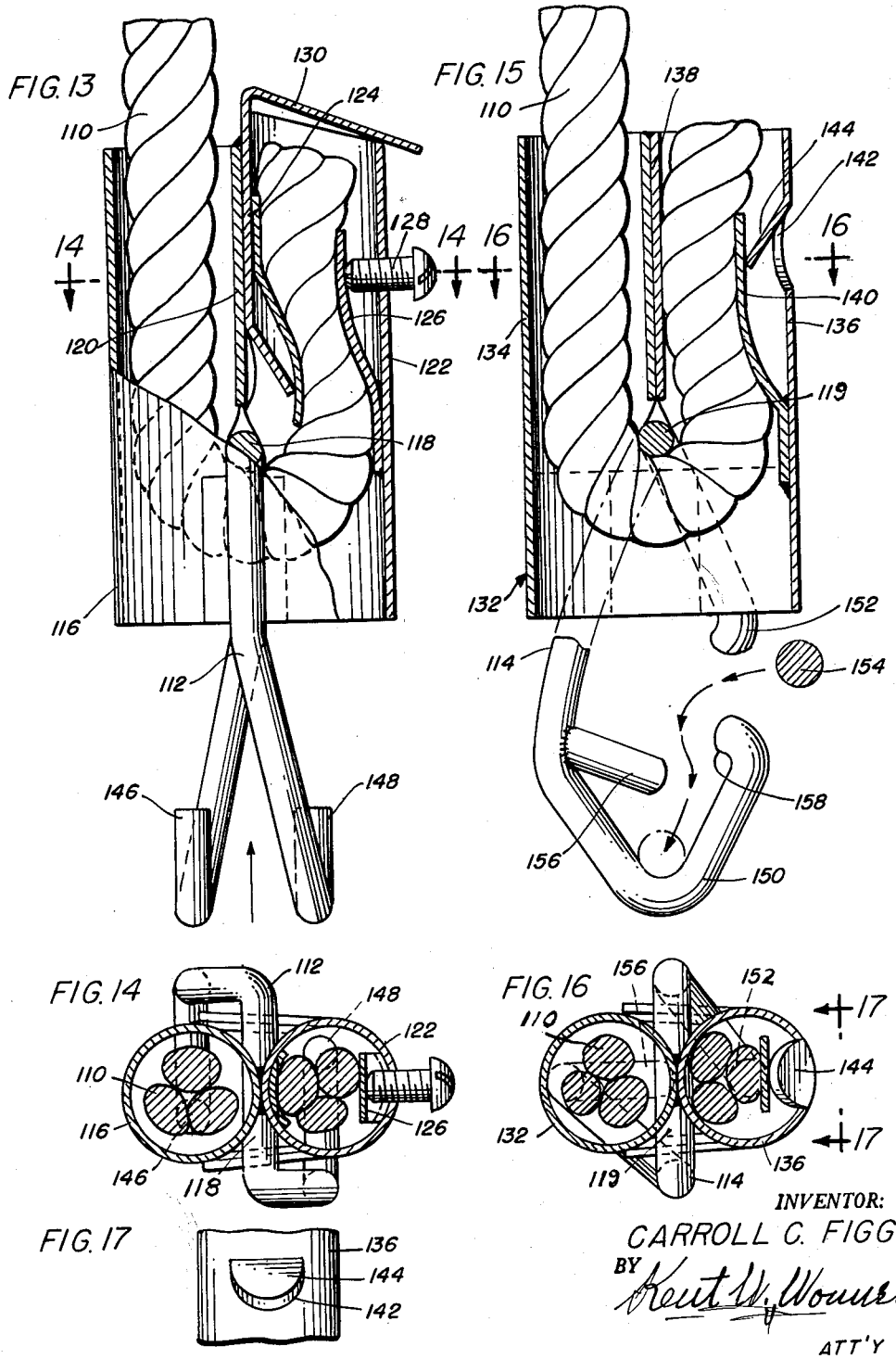
INVENTOR:
CARROLL C. FIGGE
BY
ATT'Y

United States Patent Office 3,111,733
Patented Nov. 26, 1963

3,111,733
ROPE END SPLICER AND CONNECTOR
Carroll C. Figge, Batavia, Ill.
(189 W. Madison St., Chicago 2, Ill.)
Filed Apr. 18, 1960, Ser. No. 23,042
5 Claims. (Cl. 24—125)

This invention relates in general to a mechanical rope end piece and connector and is more particularly described as a mechanical attachment for a rope end by means of which attachments may be applied thereto or one rope may be connected to another.

It has been the practice to splice rope ends or to connect other portions of ropes by intertwining the strands, thereby forming loop ends or side connections attached to eyelets, rings, hooks and the like, but gradually this art has become lost by lack of practice, and the present invention provides a mechanical splicer which depends upon snubbing and frictionally engaging the end of a rope so that a great pull may be exerted by the rope without danger of the splicer becoming disengaged or slipping from the end of a rope to which it is applied.

An important object of the invention is therefore in the provision of a mechanical splicer which may be applied to a rope to take the place of an ordinary rope splice.

A further object of the invention is to provide means for snubbing the end or an intermediate portion of a rope by doubling it upon itself and engaging one or both of the doubled portions.

A further object of the invention is to provide means for oppositely displacing, bending or distorting a rope and thereby mechanically snubbing the rope and increasing frictional resistance on the rope and preventing the disengagement of the splicer.

A further object of the invention is to provide a rope end splicer comprising a sleeve into which the end of a rope is inserted and means extending through the sleeve and engaging the rope for kinking, distorting and snubbing it.

A further object of the invention is to provide a rope end splicer to which other connectors, hooks and attaching means may be applied and included in bending or frictional engagement of the rope.

A still further object of the invention is to provide a rope end connector having interengageable means for connecting it to a similar rope end connector and thus for connecting or extending the broken or continuing rope connections.

Figure 6:
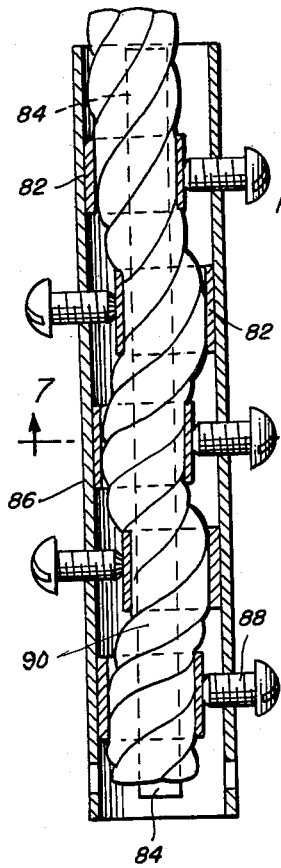
Figure 8:
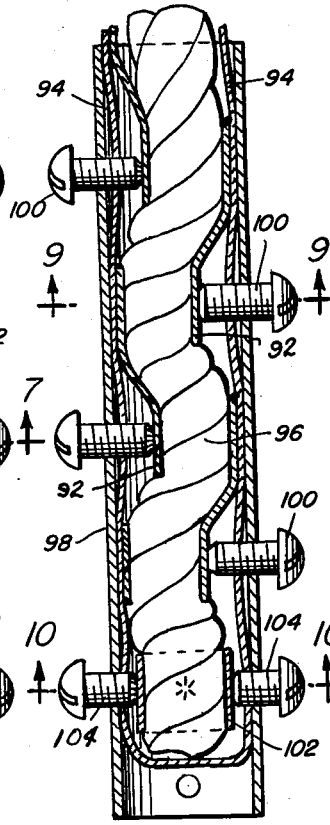
Figure 11:
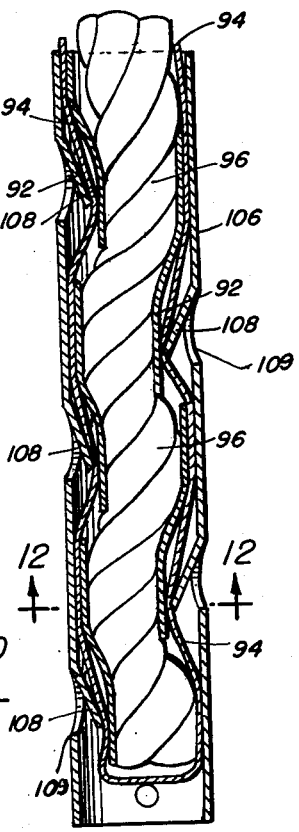
Figure 7:
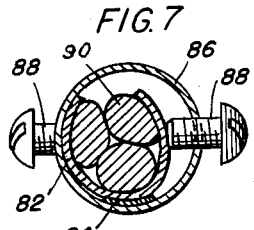
Figure 9:
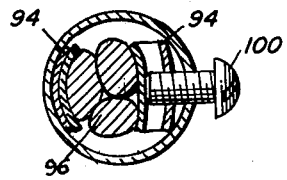
Figure 12:
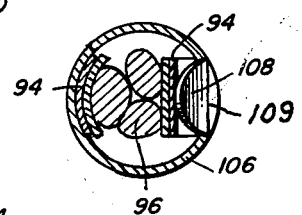
Figure 7A:
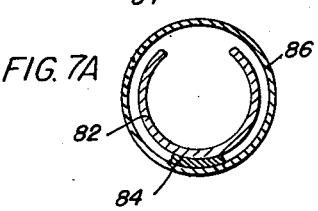
Figure 10:
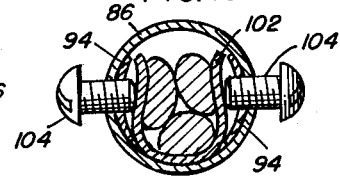

Other objects of the invention will appear in the specification and will be apparent from the accompanying drawings in which, FIG. 1 shows a straight tubular rope end connector with a spring protected hook at the end; FIG. 2 is a front elevation of a portion of the hook means shown in FIG. 1; FIGS. 3 and 4 are side and front elevations of a modified end hook as applied to the splicer sleeve of FIGS. 1 and 2; FIG. 5 illustrates a connector for joining two rope end splicers of the type shown in FIG. 1 connecting two rope ends together; FIG. 6 is a sectional view of a rope end connector having opposite connector bands attached to a common longitudinal connector; FIG. 7 is a sectional view as taken on the line 7—7 of FIG. 6; FIG. 7A is a sectional view showing the rope connector parts of FIG. 7 before distortion; FIG. 8 illustrates a different rope end connector having screw engaged fingers oppositely and alternately arranged and connected in the attachment sleeve; FIG. 9 is a sectional view taken on the line 9—9 of FIG. 8; FIG. 10 is a sectional view taken on the line 10—10 of FIG. 8; FIG. 11 is a sectional view of a similar rope end connector having cut-outs bendable inwardly and oppositely from the sides of a tube engaging depressible fingers to distort and snub a rope therein; FIG. 12 is a sectional view taken on the line 12—12 of FIG. 11; FIG. 13 is a sectional view of a rope end connector engaging a loop end of a rope and having a hook suspended in the bight of the rope; FIG. 14 is a sectional view taken on the line 14—14 of FIG. 13; FIG. 15 is a sectional view similar to that of FIG. 13 in which the bent end of the rope is engaged by a depressible cut-out in the wall of an enclosing casing; FIG. 16 is a sectional view taken on the line 16—16 of FIG. 15; and FIG. 17 is a detached elevational view of the depressible cut-out in FIG. 16 and as taken on the line 17—17 of FIG. 16.

This invention depends upon the principles of snubbing obtained by bending, distortion and pressure on relatively opposite parts of a rope, by clamping or pressing it alternately to build up friction and binding action. When even a single turn of rope is taken about a capstan, a tree or any other fixed support, it will sustain a very heavy direct pull on the rope against the support so that in this splicer, the rope is firmly held and is not easily disconnected or loosened by a heavy direct pull thereon.

Referring now more particularly to the drawings, this principle of snubbing may be shown in a variety of ways; in FIG. 1, a sleeve 20, preferably of metal and slightly larger than a rope 22 to which it is applied, is provided on the inside with relatively opposite fingers 24 preferably of bendable metal extending lengthwise of the sleeve, attached at one end by spot welding (or otherwise to the inside of the sleeve, with the free end thereof extending oppositely from the direction of insertion of the rope. A number of these fingers 24 are arranged alternately and oppositely in the sleeve, and extending through the sleeve from the outside thereof are contact screws 26 threaded through holes in the tube and the inner end of each screw engaging the free end of one of the fingers 24 and pressing it against the rope 22 which has previously been inserted into the sleeve.

At or near the extremity of the rope within the sleeve is a U-shaped clip 28 (see also FIG. 10) which extends transversely of the sleeve 20, is secured to the sleeve between its ends, and has free extremities adapted to be engaged by contact screws 30 at opposite sides of the tube. When a rope is inserted under the fingers and within the U-shape clip, and the contact screws secured in place, the rope is bent, distorted, snubbed and secured at the end to provide a very substantial engagement with the rope end so that it is not easily disengaged from the sleeve no matter how strong a pull is exterted on the other portion of the rope.

To the rope end portion of the sleeve, a doubled end support hook 32 may be attached by welding or otherwise, the two ends of the hook being spaced apart in the end of the sleeve, with a slot 34 between them, and the end 36 of the sleeve being cut at an angle transversely thereof so that a wide opening will be provided between the shorter end of the sleeve and the extremity of the hook to facilitate the engagement of a ring or other connector with the end of the hook.

In order to resiliently secure a ring 38 or any other support in the hook, a wire keeper 42 is inserted through a hole 40 near the shorter side of the sleeve and has an intermediate loop 44 engaging the material of the sleeve between the hole 40 and the end thereof for retaining the keeper in place. One end 46 of the keeper extends across the sleeve and through the slot 34 at the other side thereof with a turned-up knob 48 forming an extremity for engaging and operating the keeper. At the other end of the keeper is a bent and angled portion 50 which is adapted to extend between the doubled end of the hook 32 and to engage in the doubled end thereof as a limiting position with the adjacent extremity 52 extending transversely across the hook in a position to retain a connected ring 38 or other support therein.

To insure that the keeper will be maintained in this position, a coil spring 54 may be attached at one end to the extremity of the sleeve and may be looped about the end 46 of the keeper at its other end, thereby tending to maintain the keeper in contact with the doubled end of the hook 32. To insert a ring 38 or any other member in the hook 32, it is necessary only to press it against the keeper between the loop 44 and the angled part 50 to open the keeper against the pressure of the spring 54 which will allow the ring to be seated therein, from which it cannot be disengaged except by manually opening the keeper by pressing the end 46 upwardly.

A slightly different form of keeper is shown in FIGS. 3 and 4 in which the doubled supporting hook 32 is secured at the end of a sleeve 56 with a square cut end, the two sides of the hook adjacent the attachment to the sleeve being provided with projections 58 in which a cross pivot 60 is mounted. One end of a locking lever 62 is secured to the pivot and swings between the ends of the hook, the outer or free end being of sufficient length to engage in the doubled end of the hook 32 as a limiting position. The lever has a spring 64 connected at one end to the lower end of the sleeve 56 and the other end of the spring is connected intermediate the ends of the locking lever 62 preferably by means of a transverse perforation 66 in which the end of the spring is hooked. To engage any supporting member with this hook, the outer end of the lever is pressed inwardly against the spring 64, allowing the member to slip into the bight of the hook after which the lever is returned to its keeper position and the connected member can only be disengaged from the hook by manually opening the keeper, as in the form shown by FIG. 1.

If desired, a pair of rope end connector sleeves 68 and 70 as shown in FIG. 5 may be joined by a link 72 having eyes 74 at opposite ends and bolts 76 extending through opposite openings 78 near the adjacent ends of the sleeves 68 and 70 with fastening nuts 80 at the outside ends for holding the bolts in place.

With this construction, a line may be lengthened or a broken rope line may be repaired and connected together.

As shown in FIGS. 6 and 7, a plurality of pressure ring segments 82 are secured intermediate their ends and at right angles to a carrier strip 84 adapted to be inserted with the rings sufficiently close into one end of a rope end connector sleeve 86, alternate rings being spaced oppositely from the strip 84 sufficient distances so that they can be engaged at one side by contact screws 88 inserted through the sleeve on corresponding opposite sides thereof, and to press the ring with a rope 90 inserted therein in opposite directions, thereby offsetting kinking and binding the rope in the sleeve when the screws are tightly applied. This assembly with the carrier strip 84 and the partial ring segments 82 secured thereto may be separately formed and inserted in the sleeve 86 either before or after the rope is applied thereto, but before the screws 88 are applied for securing it in place.

In a somewhat similar manner, as shown in FIGS. 8, 9 and 10, a plurality of rope engaging fingers 92 may be secured oppositely at the inside of a doubled carrier strip 94 of sheet metal to which the fingers are attached by welding, the strip adapted to overlap the end of a rope 96 which is inserted in a sleeve in contact or in engagement with the rope. At opposite sides of the sleeve are openings for receiving locking screws 100 which extend also through the carrier strip and against the free ends of the fingers 92, thereby deforming the rope end, binding it tightly in place. At the extremity of the rope, a transverse ring segment 102 may be engaged at opposite sides through the strip 94 by locking screws 104.

This same assembly of rope end 96, carrier strip 94 and bendable rope engaging fingers 92 attached to the strip (but omitting the ring segment 102 and its locking screws 104) may be applied to a rope end engaging sleeve 106 as shown in FIGS. 11 and 12, in which the free ends of the fingers 92 are engaged and deflected together with the rope by depressible partially engaged knock-out segments 108 which may be deflected and applied within the sleeve 106 by means of a hammer or a blunt instrument which may be inserted in openings 109 made by the knock-out segment.

In all of the last three forms, the carrier strips 84 and 94 are preferably formed of relatively light-weight bendable metal which is easily applied to and over the end of a rope before it is inserted in the rope end sleeve. The contact screws are usually inserted in threaded holes provided through the sleeves as 86 and 98, but the holes may be unthreaded, the screws may be self-threading screws and they engage directly with the contact rings or fingers for distorting and adding pressure to the rope ends to which they are applied.

In the rope end connectors as shown in FIGS. 13 and 15, the end of a rope 110 is upset, bent upon itself around a supporting hook 112 or 114, more nearly simulating a well known type of snubbing action.

As shown in FIGS. 13 and 14, a shell 116 is formed with two adjacent tubular portions at opposite sides of a transverse portion 118 of the hook 112 near the lower end of the shell around which the lower end of the rope is looped or hooked. Above the transverse portion 118 which extends across and through the shell 116 is a partition 120. A terminal portion 122 of this shell 116 may be formed by cutting and bending a straight tube, either round or rectangular, to provide two parallel sections joined at the bottom, or a larger tube may be formed with a partition above the transverse portion 118 of the supporting hook.

As shown in FIG. 13, a spring tongue 124 is mounted at the inner side of the terminal portion 102, the free end extending oppositely to the insertion of the end of the rope 110, and in the wall of the terminal portion opposite the spring tongue 124 is another spring tongue 126 engaged by a locking screw 128 inserted from the outside of the terminal portion 122, and the screw adapted to engage the rope end near the extremity thereof and operating to prevent the withdrawal of the end of the rope from this terminal section 122. In this form, the inner side of the terminal portion 122 is formed with an extension 130 which projects over the upper end of the terminal portion in the position shown in FIG. 13, so that if supported in this position, the adjacent end of the rope will be protected against the weather, as water tends to rot the rope, and the extension is inclined downwardly and outwardly to deflect water and dirt in that direction although the extension does not fit tightly against the end of the terminal portion 122 so that the rope end receives air therethrough.

In FIG. 15, a shell 132 has parallel portions 134 and 136, the latter being the terminal portion, and the shell being formed by cutting and bending a single straight shell or by placing a partition in a single hollow shell of sufficient cross section to receive both of the rope end portions and inserting a partition extending upwardly from the supporting hook 114 and corresponding to adjacent inner walls 138 of the parallel sections 134 and 136. In this form, a single deflecting and snubbing finger 140 is secured at one end to the inner wall of the parallel portion 136, the free end thereof extends upwardly opposite to the direction of insertion of the rope end, and in the adjacent wall of this shell portion is a partial opening 142 forming a knock-out segment 144 which may be engaged and forced inwardly against the free end of the deflecting and snubbing finger 140 engaging the finger with the rope and snubbing and holding the rope tightly in position.

The supporting hook 112 may have oppositely extending terminal portions 146 and 148 which extend angularly apart at the bottom so that, to engage a bail or a link therewith, it is inserted upwardly between the two extremities and above the ends thereof and then turned in a direction at right angles to engage both portions of the bail with the upwardly extending terminal portions 146 and 148. Thus it is not easy to disengage a bail or a ring without raising it relatively to the hook and turning it in the proper direction.

The supporting hook 114 has angular extremities extending from the transverse portion 119 thereof, one portion 150 having a V-shaped hook at the bottom and the other end having a downwardly extending arm 152 spaced from the upper end of the hook 150 so that a bail or supporting arm 154 may be inserted between them and when released, or, when the rope end is raised, the bail or arm will pass to the bottom of the inside of the hook 150 in which position a projection 156 will partially overlie the bottom of the hook so that the arm or support is not easily engaged from this hook but must pass outwardly toward the open end of the arm around the end of the projection 156, the upper end of the extremity of the hook being also formed with a projection 158 which tends to restrain and hold a bail or arm in the hook, thus requiring that the bail or arm to be removed from the hook must be raised in one direction and then moved oppositely in the other direction before it can be disengaged from the opening between the end of the extending arm 152 and the inwardly extending projection 158 of the hook.

This hook construction may also be applied to the ends of the straight sleeves as shown in FIGS. 1, 5, 6, 8, and 11, and the hook constructions shown in FIGURES 1 and 3 may also be similarly connected to the sleeves shown in FIGS. 13 and 15. Although the sleeves have been described and considered as circular sleeves, it is also contemplated that the sleeves and particularly those shown in FIGS. 13 and 15 may be oval or rectangular, it being only necessary and advisable that the open portions of the hooks be only slightly larger than the ropes to which they are applied, but allowing sufficient space between the rope and the inside of the sleeves for the insertion of the carrier strips for moving the locking fingers into the proper engaging positions.

While preferred forms of the invention have been described in some detail, they should be regarded by way of illustration and example rather than restrictions or limitations thereof, as many changes in the construction, combination and arrangement of the parts may be made without departing from the spirit and scope of the invention.

I claim:

1. A rope splicer and end connector comprising a rigid sleeve to fit loosely about a rope having movable fingers extending inwardly from said sleeve in the direction of insertion of the rope from the said sleeve and engaging the rope, means comprising threaded contact members passing through apertures in said sleeve, and having threaded engagement therewith, to engage said fingers within the sleeve for pressing them against the rope to engage, distort and snub the rope against removal of the rope from the sleeve opposite the direction in which it is inserted, and connector means at the sleeve end opposite the rope insertion end.

2. A rope splicer and connector in accordance with claim 1, in which the said fingers extend at opposite sides and at spaced distances apart within the sleeve and alternately engage, distort, and snub the rope within the sleeve for opposing its movement therefrom.

3. In a rope end splicer and connector in accordance with claim 1, comprising a hook attached to the sleeve at the end opposite the rope insertion end, and a pivoted keeper, said hook comprising a member bent doubly to form two parallel U-shaped elements joined by an arcuate portion, the keeper being connected to the sleeve and movable between the said parallel elements to close the hook to oppose the entry and disengagement of a load member to and from the hook.

4. In a rope end splicer and connector, a sleeve for the insertion of a rope, rope engaging means comprising opposite spaced fingers attached to the interior of said sleeve, clamping means extending through the sleeve and operated from the outside thereof to engage the fingers and opposing the entry of the rope to the sleeve in one direction, the said fingers being bendable to oppositely engage, distort and snub the rope by the operation of said clamping means to oppose removal of the rope in the other direction, a hook attached at the end of the sleeve opposite the rope insertion end, a keeper pivoted to the sleeve and movable to a position to close the hook, and a spring pivoted to the sleeve and connected to the keeper tending to retain the keeper in a closed position with respect to the hook.

5. In a rope end splicer and connector, a rigid sleeve to fit loosely about the end of a rope, means attached to the inside surface of said sleeve to engage alternately the opposite sides of the outside of a rope, means extending through the sleeve for clampingly engaging said means to distort and snub the rope, a load engaging hook attached to said sleeve, a keeper pivoted at the end of said sleeve opposite the end in which the rope is inserted, and a spring connected to the keeper and to the sleeve tending to retain the keeper in a position to enclose said hook.

References Cited in the file of this patent

UNITED STATES PATENTS

| 538,075 | Herrberg | Apr. 23, 1895 |
| 878,060 | Hammond | Feb. 4, 1908 |
| 1,266,441 | Finkelstein | May 14, 1918 |
| 1,744,419 | Soule | Jan. 21, 1930 |
| 1,882,167 | Thirlwell | Oct. 11, 1932 |
| 2,016,065 | Wilson | Oct. 1, 1935 |
| 2,349,648 | Brickman | May 23, 1944 |
| 2,997,688 | Nielsen et al. | Aug. 22, 1961 |

FOREIGN PATENTS

| 256,320 | Switzerland | Feb. 16, 1949 |